United States Patent [19]

Cugnini et al.

[11] Patent Number: 4,602,381
[45] Date of Patent: Jul. 22, 1986

[54] ADAPTIVE EXPANDERS FOR FM STEREOPHONIC BROADCASTING SYSTEM UTILIZING COMPANDING OF DIFFERENCE SIGNAL

[75] Inventors: Aldo G. Cugnini, Tarrytown, N.Y.; Daniel W. Gravereaux, New Canaan; David W. Stebbings, Ridgefield, both of Conn.

[73] Assignee: CBS Inc., New York, N.Y.

[21] Appl. No.: 688,854

[22] Filed: Jan. 4, 1985

[51] Int. Cl.$^4$ ............................................. H04H 5/00
[52] U.S. Cl. .................................... 381/13; 381/106; 333/14
[58] Field of Search ......................... 381/2, 3, 4, 5, 13, 381/106; 333/14; 329/124, 130, 132, 135, 146; 332/17, 21, 22, 234, 40, 44, 48

[56] References Cited

U.S. PATENT DOCUMENTS

| | | | |
|---|---|---|---|
| 3,067,292 | 12/1962 | Minter | 381/2 |
| 4,016,366 | 4/1977 | Kurata | 381/5 |
| 4,338,491 | 7/1982 | Parker et al. | 381/16 |
| 4,376,916 | 3/1983 | Glaberson | 333/14 |
| 4,485,483 | 11/1984 | Torick et al. | 381/4 |
| 4,534,054 | 8/1985 | Maisel | 381/14 |

Primary Examiner—Forester W. Isen
Attorney, Agent, or Firm—Spencer E. Olson

[57] ABSTRACT

A stereophonic broadcasting system incorporating companding of the difference signal in which both the usual difference signal and a compressed version of the difference signal are transmitted to one or more remote receivers. At the receiver the usual, unchanged, difference signal is used as a reference signal for controlling the expansion of the compressed difference signal so as to cause the amplitude of the companded difference to equal the level of the usual difference signal. Thus, the expander is adaptive to any compression characteristic that might be employed at the transmitter. Further, the availability of the usual uncompressed difference signal at the receiver enables the adaptive decoding of dynamic parameters of the received signal, such as frequency response and attack and recovery times, so that all of the parameters of the original signal can be restored automatically.

12 Claims, 11 Drawing Figures

COEFFICIENTS:

$A = 0.45(M) + 0.45(S)\sin wt + 0.45(S')\cos wt + 0.1 \sin \frac{wt}{2}$

ADAPTIVE EXPANDERS FOR FM STEREOPHONIC BROADCASTING SYSTEM UTILIZING COMPANDING OF DIFFERENCE SIGNAL

BACKGROUND OF THE INVENTION

This invention relates to FM stereophonic broadcasting systems and, more particularly, to adaptive expanders for FM stereophonic broadcasting systems utilizing companding of the difference signal.

It is known from U.S. Pat. No. 4,485,483 of Emil L. Torick and Thomas B. Keller, the disclosure of which is hereby incorporated herein by reference, to compand the difference signal in a modulated channel that is in quadrature with the channel normally used for stereo in such a way as not to increase the bandwidth requirements for transmission. In the system disclosed in this patent (hereinafter sometimes referred to as the "Torick/Keller system") the usual left and right signals are conventionally matrixed to obtain conventional sum (M) and difference (S) signals. The difference signal is used to amplitude-modulate a first sub-carrier signal and at the same time is applied to a compressor which compresses its dynamic range in accordance with a given law to produce a compressed difference signal S'. The compressed difference signal S' is used to amplitude-modulate a second sub-carrier signal, preferably of the same frequency but in quadrature phase relationship with the first. Suppressed-carrier, double-sideband modulation of each sub-carrier is employed, with the frequency of the sub-carrier signal being sufficiently high to assure a frequency gap between the lower sidebands of the modulated sub-carrier signals and the M signal. A conventional low-level phase reference pilot signal of a frequency lying within the frequency gap is employed for detection purposes at the receiver. The M signal, the two modulated sub-carrier signals, and the pilot are modulated onto a high-frequency carrier for transmission purposes. The receiver includes a demodulator for deriving the M signal, the normal difference signal S and the compressed difference signal S', and an expander for complementarily expanding the derived compressed difference signal. The expanded noise-reduced version of the difference signal is combined with the derived sum signal M to obtain the original left (L) and right (R) signals. The receiver also includes switch means for applying the normal difference signal S, instead of the expanded version of the derived difference signal, to the combining means for enabling the receiver for reproduction of conventional stereophonic signals. Companding of the difference signal S gives 22 dB to 26 dB signal-to-noise improvement in the transmission and enables the stereo listener to enjoy the same signal-to-noise ratio as does the conventional monophonic listener. This amount of reduction of received noise greatly increases the effective stereo service area by improving the quality of the signal received by listeners located within the service area.

Commonly assigned U.S. patent application Ser. No. 688,940 filed concurrently herewith by applicant David W. Stebbings, the disclosure of which is hereby incorporated herein by reference, discloses an improved FM stereo system that is similar to the Torick/Keller system in that the usual difference signal S and a compressed difference signal S' are both transmitted. However, unlike the Torick/Keller system, in which only the expanded version of the received compressed difference signal is matrixed with the sum signal M to obtain the original L and R signals, the receiver according to the Stebbings disclosure matrixes a noise-reduced difference signal, derived by combining and expanding the received difference signals S and S', with the derived sum signal M to obtain the original L and R signals. Since the signal content of the signals S and S' is the same, by combining them the effective level of the received difference signal is increased by 6 dB, whereas the noise is increased by only 3 dB, resulting in a net 3 db improvement in signal-to-noise ratio.

The transmission of the uncompressed difference signal S (necessary for compatibility with existing systems), coupled with the utilization at the receiver of both the uncompressed and the compressed difference signals, allows any desired companding law to be used in the compressor for the difference signal. For example, instead of being limited to the 2-to-1 slope typical of the "CX" companding system described in commonly assigned U.S. Pat. No. 4,376,916, or to the characteristics of other known companding systems, it is possible to use a compressor having an infinity-to-one or similar companding characteristic which provides a subjectively assessed 10 dB to 12 dB improvement against program modulated noise for a given amount of noise reduction over that realizable with such prior art companders.

A primary object of the present invention is to provide an improved FM stereophonic broadcasting system which better utilizes the greater channel capacity of the Torick/Keller system while still realizing its improved signal-to-noise advantage.

Another object of the invention is to provide an adaptive expander for use in the receiver having the capability of adapting to any compressor characteristic that may be employed at the transmitter.

Yet another object is to provide an expander for use in an FM stereophonic system that is capable of adaptive frequency response decoding and adaptive attack and recovery time decoding so that all parameters of the original signal can be restored automatically regardless of the compression law used in transmission.

SUMMARY OF THE INVENTION

The FM stereophonic broadcasting system of the present invention utilizes the Torick/Keller concept of transmitting both the usual difference signal S and a compressed difference signal S' and the Stebbings concept of combining the usual difference signal and the expanded version of the compressed difference signal at the receiver to achieve greater noise reduction and improved signal-to-noise ratio. The present invention is based on the realization that because the normal difference signal is transmitted completely unchanged (for compatibility with existing receivers) it can be used at the receiver as a reference signal for controlling the expander so as to cause the amplitude of the companded difference signal to equal the level of the normal difference signal and thus insure proper dematrixing with the received sum signal M. This feature offers the important advantage of the expander being adaptive to any compressor characteristic that might be employed at the transmitter, from which it follows that should companding characteristics other than those initially selected for use at the transmitter be developed in the future, it would not be necessary to replace existing receivers to exploit them; rather, it would be necessary only to change the transmitter to incorporate a new compressor and the expander would adapt to it.

Similarly, the uncompressed difference signal available at the receiver allows adaptive decoding of dynamic parameters of the received signal, such as frequency response and attack and recovery time constants, so that all of the parameters of the original signal can be restored automatically whatever transmission system is used.

BRIEF DESCRIPTION OF THE DRAWINGS

Other objects, features, and advantages of the invention, and a better understanding of its construction and operation, will be had from the following detailed description when considered in conjunction with the accompanying drawings, in which.

DETAILED DESCRIPTION OF A PREFERRED EMBODIMENT

Figure 1:
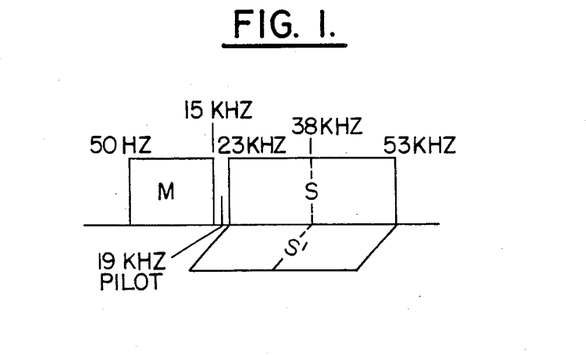
FIG. 1 is a frequency diagram of the composite baseband signal developed in accordance with the principles of the present invention.

In common with the Torick/Keller system and the system disclosed in the aforementioned Stebbings application, in the transmitter of the present system a compressed difference signal (hereinafter designated S') is added to the conventional composite FM signal utilized in the existing two-channel stereo system approved by the FCC. The compressed difference signal is conveniently transmitted as a double-sideband suppressed 38 kHz quadrature sub-carrier signal S' cos ωt. Thus, the composite baseband signal may be represented by the equation:

$$e_m = M + p\sin\frac{\omega t}{2} + S\sin\omega t + S'\cos\omega t \qquad \text{Eq.(1)}$$

where p represents the amplitude of the pilot signal and $\omega = 2\pi \cdot 38$ kHz. As is evident from the frequency spectrum of the composite signal illustrated in FIG. 1, the quadrature sub-carrier requires no additional spectrum space and, as will be seen, imposes no penalty in modulation potential because of the adaptive quality of the expander.

Figure 2:
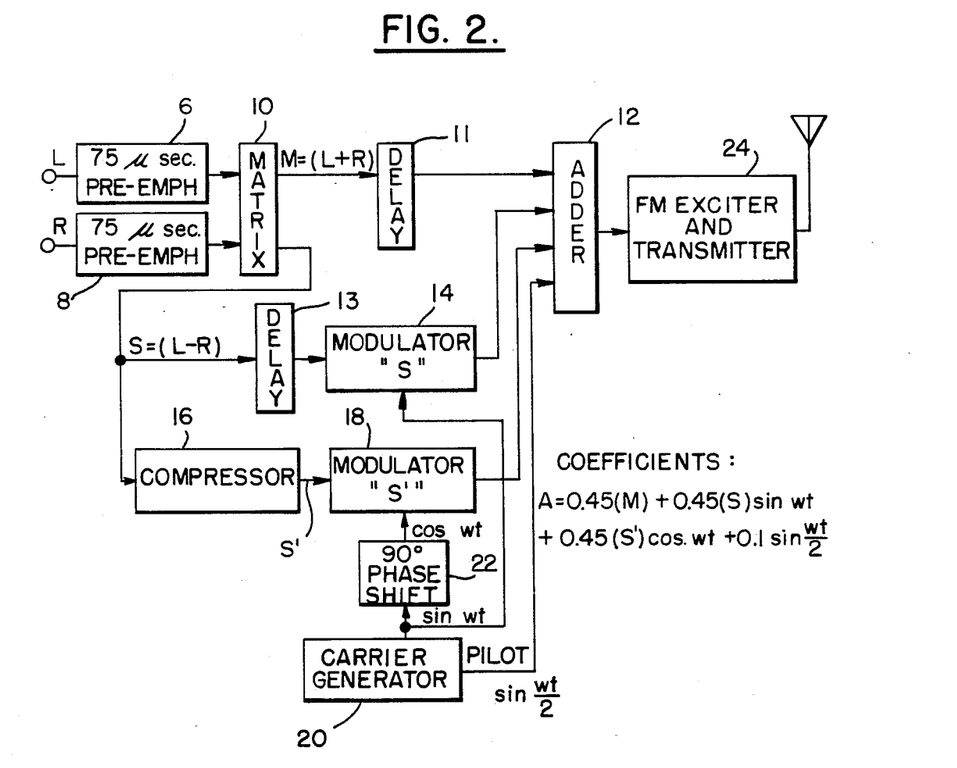
FIG. 2 is a simplified block diagram of a transmitting terminal for generating and transmitting the composite signal of FIG. 1.

A transmitter for generating this composite signal is illustrated in FIG. 2 which, in the interest of simplicity, omits some of the more conventional transmitter circuits. Two audio frequency signals L and R, derived from a stereo source (not shown), are applied via usual 75μ sec pre-emphasis networks 6 and 8 respectively, to the inputs of a conventional matrix network 10 consisting, for example, of a network of summing amplifiers arranged to produce at the output terminals of the matrix the two audio signals $M=(L+R)$ and $S=(L-R)$. The monophonic sum signal M is applied via a first delay device 11 to one input of an adder 12, and the stereophonic difference signal S is applied via a second delay device 13 to the input of a first modulator 14, and also to the input of a compressor 16 of a noise-reducing companding system; the compressor may be any of several types which will be described later. The compressed difference signal, designated S', is applied to the input of a second modulator 18, the output of which is delivered to adder 12 where it is linearly combined with the monophonic sum signal M and the signal from modulator 14. The delays introduced by delay devices 11 and 13 are such as to insure that the M signal and the two modulated signals arrive at the adder simultaneously.

The sub-carrier and pilot signals are derived from a carrier generator 20 which provides a sine wave signal having a frequency of 38 kHz which is applied to modulator 14 and also to a phase shift network 22 of known construction for providing a 90° phase displacement between the sub-carrier signal applied to modulator 18 and the sub-carrier applied to modulator 14. Modulators 14 and 18 are suppressed-carrier amplitude-modulators of known construction and serve to amplitude-modulate the two sub-carriers with respective audio frequency signals so as to produce the two double-sideband, suppressed-carrier, amplitude-modulated sub-carrier signals S sin ωt and S' cos ωt. These two signals are then combined in adder 12 with the sum signal M and a 19 kHz sine wave pilot signal, also derived from carrier generator 20. The composite signal appearing at the output of adder 12, having the amplitude co-efficients shown in FIG. 2, is then applied to the FM exciter of a transmitter 22 and frequency modulated onto a high frequency carrier for transmission to one or more remote receivers.

The compressor 16 may have any of several known companding laws, four of which are disclosed in the aforementioned co-pending application of David W. Stebbings. Actually, the construction of the compressor is not critical to the operation of the system in that the expander used at the receiver is capable of adapting to any compressor characteristic. Suffice it to say, then, that the compressor 16 is designed to have a compression characteristic that maximizes the signal-to-noise improvement. By way of example, the compressor may have the infinity-to-one compression characteristic illustrated in the signal level diagram of FIG. 3, wherein the input signals to be processed for compression are represented along the abscissa between −60 dB and a standard operating level of 0 dB. The absolute value of the input voltage rises along the abscissa from left to right up to the rated level. The output levels for compression or expansion are represented along the ordinate between −60 dB and 0 dB. The absolute value of the output voltage rises along the ordinate, from the bottom to the top, up to the rated level. Curve 30 represents the relation between the output and input levels of the normal difference signal S which, since it is transmitted unchanged (i.e., not subjected to compression) has a gain slope of one. Curve 32 represents the relationship between the input and output signal levels of the compressor 16 and shows that for input signal levels in the range between −60 dB and about −32 dB the characteristic has a slope of one; thus, input signal levels lower than about −32 dB relative to the rated level are not compressed but receive a fixed gain of about 26 dB. For input levels higher than about −32 dB, the characteristic has a compression slope of infinity; that is, beginning at the knee 34 of the characteristic, in this example set at −32 dB, the output level is the same regardless of the level of the input signal, which in this example is at a level of −6.7 dB relative to the rated level. Thus it is seen that the dynamic range of input signals between −60 dB and −32 dB has been reduced to a range between −40 dB and −6.7 dB for the output signals, and that for input signal levels greater than about −32 dB the output level remains constant at −6.7 dB. The vertically oriented arrow 36 extending between the characteristic 30 for the S signal and the compressor characteristic 32 represents the approximately 26 dB gain increase in the difference signal S' as compared to the difference signal S required to compensate for the noise penalty for stereophonic programming relative to monophonic.

Figure 3:
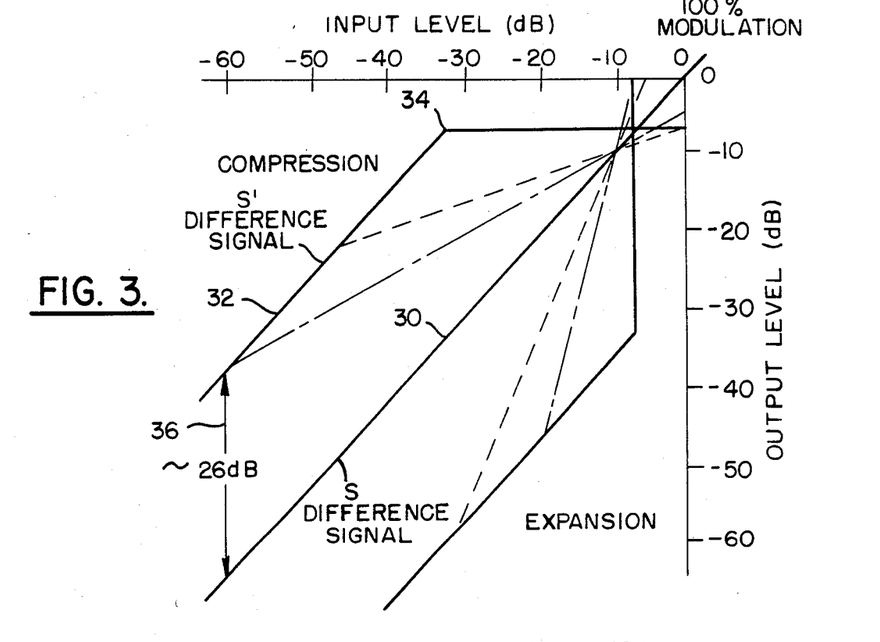
FIG. 3 shows the steady state compression and expansion characteristics of three different companding laws to which the expander of the invention is capable of adapting.

The infinity-to-one compression law for the difference signal is preferable to the 2:1 or the 3:1 compression characteristics, also shown in FIG. 3, typically employed in the "CX" companding system described in U.S. Pat. No. 4,376,916, especially in the respect that it gives a significant relative improvement against program modulated noise.

Figure 4:
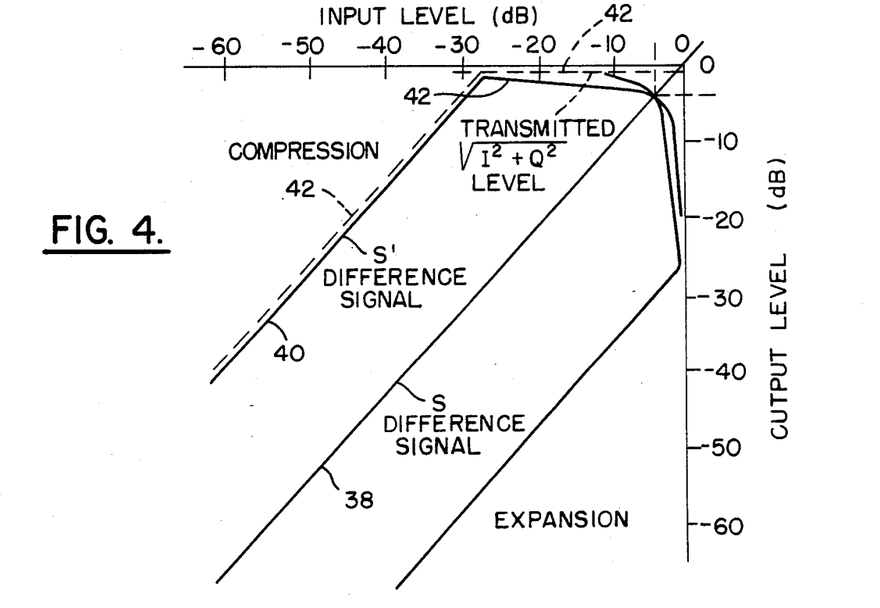
FIG. 4 shows the steady state compression and expansion characteristics of another companding law useful in the system.

As another example, the compressor 16 may be designed to have the compression characteristic 40 shown in the signal level diagram of FIG. 4, which extends with unity slope up to within a dB or two of 100% modulation and then gradually drops back from that level as the level of the difference signal (represented by curve 38 having a slope of one) rises such that addition of the S and S' signals gives an infinity-to-one characteristic (depicted by dotted line characteristic 42) that is always maintained within a small fraction of a dB of 100% modulation. The re-entrant characteristic of the curve 42 can be quite easily derived by subtracting the difference signal S from the output of a regular infinity-to-one compressor having the characteristic illustrated in FIG. 3. This re-entrant characteristic not only permits maximum possible modulation of the sub-carrier signal, it also insures that the sub-carrier is maintained at substantially constant amplitude over a wide dynamic range of program level, making it possible to transmit at 100% modulation all of the time, which assures the best possible S/N condition at the receiver.

FIGS. 3 and 4 illustrate but four examples of compressor characteristics that the expander of the invention is capable of adapting to to produce a noise-reduced expanded difference signal at the receiver. Another example is the compression characteristic of the dbx Inc. compander that has been adopted as the standard in the Electronic Industries Association system for stereo television. Whatever compression characteristic is utilized, the difference signal (L−R) is used, unchanged, to amplitude-modulate one sub-carrier signal and the same difference signal, but compressed according to the desired characteristic, is used to amplitude-modulate a quadrature sub-carrier, and then both are frequency modulated onto a high frequency carrier for transmission.

Figure 5:
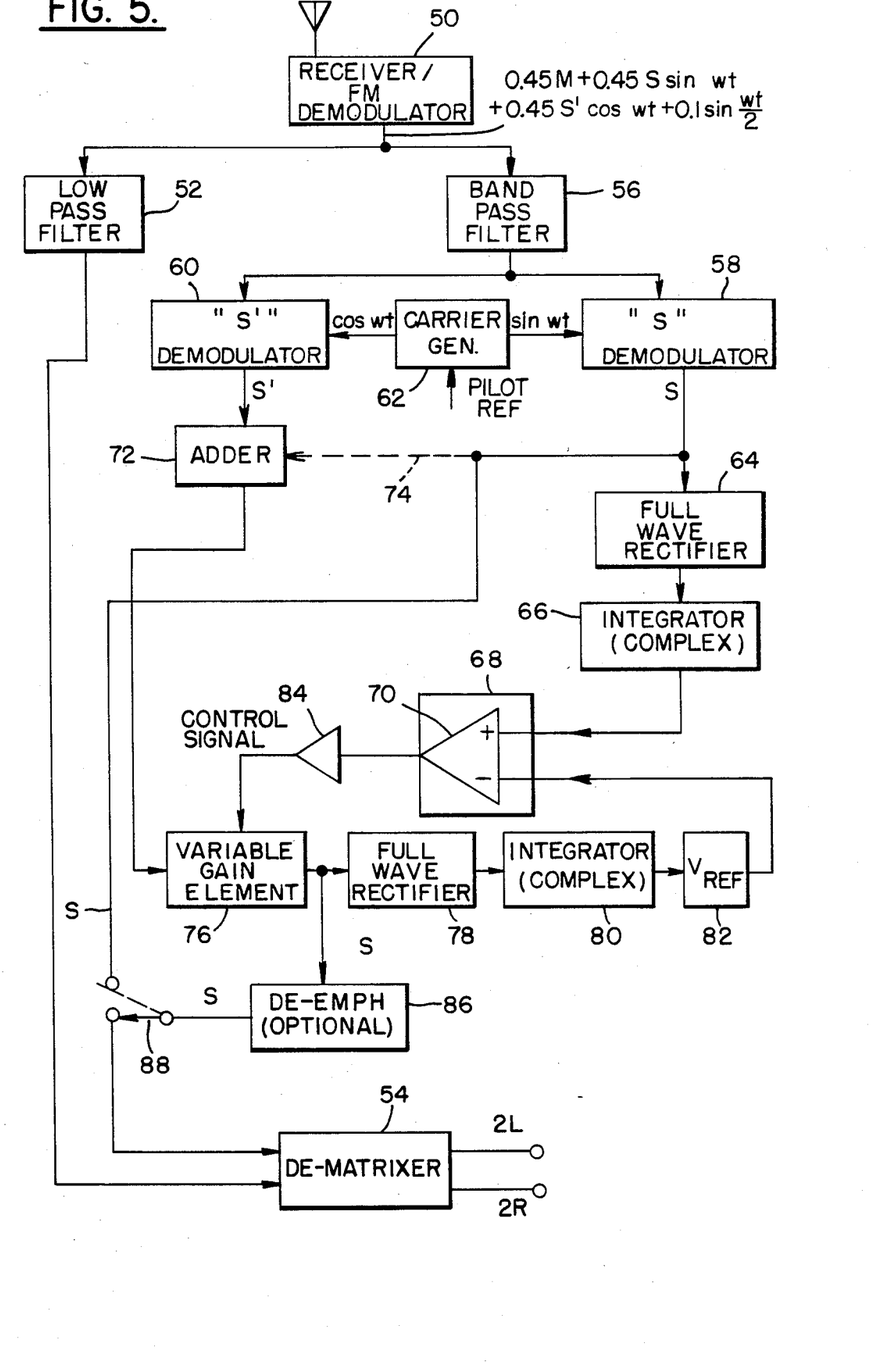
FIG. 5 is a simplified block diagram of a receiving terminal including the adaptive expander of the invention.

FIG. 5 is a block diagram of a receiver in association with a preferred form of adaptive expander according to the invention. Again, for purposes of simplicity, some of the more conventional FM receiver circuits (e.g., RF and IF stages and discriminator networks) have not been shown and will be only briefly mentioned as necessary. A received FM signal is amplified in the RF and IF stages (not shown) of a receiver/FM demodulator 50, and demodulated in any of the known FM detection circuits (not shown) to derive the audio signals contained in the received signal, namely, the signals M, S, S' and the pilot signal, each with the indicated amplitude co-efficient. The monophonic sum signal M is separated from the higher frequency components of the composite signal by a low-pass filter 52 and applied as one input to a de-matrixer circuit 54 of conventional design. The remaining components of the composite signal are selected by a bandpass filter 56 designed to pass frequencies in the band from 19 kHz to 53 kHz and to reject frequencies outside this band, and then applied to an "S" demodulator 58 and an "S'" demodulator 60. The pilot signal is derived by known means (not shown) and applied to a carrier generator 62 which regenerates quadrature versions thereof, namely, sin ωt and cos ωt, which are applied to demodulators 58 and 60, respectively, so as to obtain the signals S and S' (which has the function of (L−R) established by the compressor at the transmitter), respectively.

The availablity at the receiver of both the unchanged difference signal and the compressed version thereof enables the use of an expander that adapts to the compression characteristic, whatever its form, this being accomplished by using the received unchanged difference signal S as a reference level for developing a control signal for a variable gain element connected to receive the compressed difference signal S' and for producing a noise-reduced difference signal for application to dematrixer 54.

In the embodiment of the expander shown in FIG. 5 the received unchanged difference signal S is full-wave rectified by a rectifier 64 to produce a direct current signal having a level proportional to the amplitude of the difference signal S. This direct current signal is applied to an integrator 66 which preferably is of the complex form described in commonly assigned U.S. Pat. No. 4,376,916, which includes a network of at least three signal paths having differing time constants, the network having a common input terminal for receiving the rectified signal and a common output terminal at which the control signal is developed. All except one of the signal paths each includes a diode for causing the respective path to be conductive only in response to the rectified signal exhibiting a change in amplitude sufficient to exceed a predetermined voltage, and the said one signal path conducts in response to any differential in voltage between the input and output terminals. The output signal from integrator 66 which describes the envelope information of the unchanged difference signal S, is applied as one input to a comparator 68 which, for example, may be an operational amplifier 70, with the signal from integrator 66 applied to its positive input.

The compressed difference signal S' produced at the output of demodulator 60 is applied as one input to an adder 72 in which it may, if desired, but not necessarily, be added to the unchanged difference signal S; the dotted line connection 74 signifies the optionality of adding the two signals together at this point. Assuming that the unchanged difference signal is not added to the compressed difference signal, the compressed difference signal is simply transmitted to the input of a variable gain element 76, the output of which is applied to a second full-wave rectifier 78 which produces a direct current output signal having a level proportional to the amplitude of the signal appearing at the output of variable gain element 76. This direct current signal is applied to a second integrator 80, which may have the same construction as integrator 66 but, on the other hand, it need not have the same time constants as those used in integrator 66, nor those used in compressor 16 at the transmitter, the reasons for which will shortly become evident. A settable reference voltage level for this loop is established by a device 82 labeled $V_{ref}$, which element may be embodied in the rectifier circuit 78. The signal developed in the chain including rectifier 78 and integrator 80 is applied as a second input to comparator 68, more specifically, to the negative input of operational amplifier 70. Any output signal from comparator 68 representing a difference in the amplitude of the two applied signals is amplified by a suitable amplifier 84 to produce a control signal which is applied to the control element of variable gain element 76 to control the gain thereof.

In operation, if the levels of the output signals from integrators 66 and 80 are the same, there will be no change in the magnitude of the control signal applied to variable gain element 76 which, in turn, signifies that the level of the output signal from the variable gain element 76 corresponds to that of the unchanged difference signal S. Viewed in another way, the function of comparator 68 is analogous to that of the threshold level of conventional expanders in that no change is made to the voltage level determined by the unchanged difference signal S until the signal level is above the so-called knee of the transfer characteristic. In the present circuit, the threshold, instead of being a preset fixed signal as is the case in conventional expanders, is a signal derived from the unchanged difference signal S, which, of course, varies in amplitude with certain attack and recovery times, but is at the level that the compressed signal S' should be. Thus, instead of there being a fixed reference voltage, the comparator 68 provides a changing reference level which dynamically varies with the changes in level of the unchanged difference signal S itself. The purpose of the $V_{ref}$ device 82 is to establish a fixed gain difference equal to the fixed gain difference of the compressor employed at the transmitter so as to preclude variable gain effects on signals below a certain level, that is to say, to provide the equivalent of a "knee" to offset errors that could occur if the signal-to-noise ratio of the difference signal S is not sufficiently high. At input signals levels above such "knee", the level of the signal appearing at the output of variable gain element 76 is determined by the amplitude of the control signal developed in comparator 68 which, in turn, is dependent on the amplitude of the unchanged difference signal S. By virtue of controlling the gain of variable gain element 76 with a control signal proportional to the difference between the level of the compressed difference signal and the unchanged difference signal, the output of variable gain element 76 is the signal S, except that it has been subjected to noise reduction by reason of the expansion of the compressed difference signal that takes place in the control loop. The signal S produced at the output of variable gain element 76 is applied to the input of an optional de-emphasis circuit 86 (which is used only if pre-emphasis is used in the transmitter) and the output thereof is applied via a switch 88 to the second input of dematrixer 54.

The level of the signal S appearing at the output of variable gain element 76 is set by the $V_{ref}$ device 82 and amplifier 84 to be equal to the level of the received unchanged difference signal S and using that signal as a reference level gives the expander the important advantage of being capable of adapting to any of a wide variety of companding laws. Thus, in the event a new type of compression transfer characteristic were to be developed in the future, it would not be necessary to scrap the described expander and replace it with a new receiver expander in order to take advantage of the new transfer characteristic. Because its operation depends only on the level of the unchanged difference signal S, any type of compression law currently available, or as may be developed in the future, would be satisfactorily decoded by the adaptive system of FIG. 5.

Unlike most existing companding systems, which require a very specific law for compression and a specific complementary law for expansion to achieve satisfactory performance, this adaptive system is not critically sensitive to the compression law, and even time constants are not as important, because the receiver always has a reference level derived from the unchanged difference signal S.

Reverting now to FIG. 5, in addition to operating as previously described, the receiver is fully compatible with conventional monophonic and two-channel (biphonic) stereophonic broadcasts. When a monoaural broadcast is being received, the output of receiver/FM demodulator 50 comprises only the monaural signal M consisting of (L+R). This signal is selected by low pass filter 52 and applied to de-matrixer 54, and since no signal is applied to the second input of the de-matrixer, only the signal M appears at each output of the dematrixer for application to the left and right loudspeakers, respectively.

For enabling the receiver to reproduce a received conventional two-channel stereo signal, the switch 88 preferably is automatically actuated from the position shown to the dotted line position so as to connect the output of demodulator 58 to the second input of dematrixer 54. Such automatic switching can be achieved, for example, by any of several known techniques, such as modulating the pilot tone, or adding a separate identification signal, when a compressed difference signal is also being transmitted; a detector in the receiver (not shown) responsive to the identification signal produces a signal for actuating the switch 88 from the solid line position to the dotted line position. Thus, when a conventional two-channel stereo signal is received, the M signal, as before, is applied to one input of de-matrixer 54 and the S signal derived from demodulator 78 are combined in the de-matrixer to produce output signals 2L and 2R, the amplitude of each of which is then reduced by one-half prior to application to the left and right loudspeakers.

Figure 6:
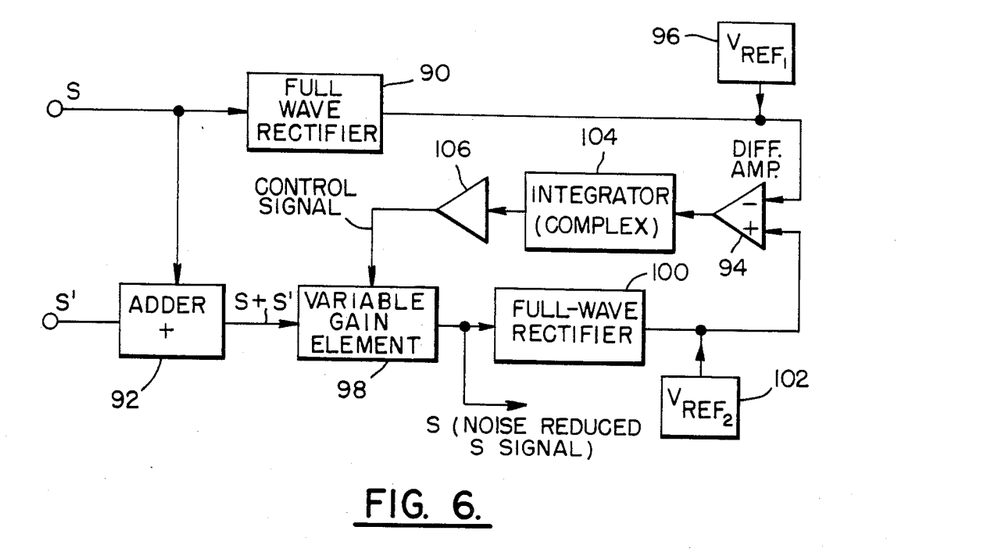
FIG. 6 is a simplified block diagram of an alternative form of adaptive expander embodying the invention.

FIG. 6 shows an alternative configuration of the adaptive expander of FIG. 5, the difference being that instead of having two integrators, each following a respective full-wave rectifier and the outputs of the integrators applied to the comparator, the outputs of the rectifiers are applied to the comparator and its output applied to a single integrator. More particularly, the uncompressed signal S from demodulator 58 is applied to a first full-wave rectifier 90 and is also applied as one input to an adder 92 in which it is preferably added to the compressed difference signal S' from demodulator 60. The direct current signal from rectifier 90, which has a level proportional to the amplitude of the difference signal S, is applied to one input of a comparator, such as a difference amplifier 94. A settable reference voltage level for this loop is established by a device 96 labeled $V_{ref.1}$, which element may be embodied in the circuit of rectifier 90, and the purpose of which will be described presently. The signal from adder 92, representing the sum of signals S and S', is applied to the input of a variable gain element 98, the output of which is applied to a second full-wave rectifier 100 which produces a direct current output signal having a level proportional to the amplitude of the output signal from variable gain element 98. This direct current signal is applied to the other input of difference amplifier 94. A second voltage reference device 102, designated $V_{ref.2}$, establishes a reference voltage level for this loop. Any output signal from the comparator representing a difference in the amplitude of the two applied signals (after taking into account the reference voltage levels established by elements 96 and 102) is applied to an integrator 104, preferably of the complex type described above. The output signal from integrator 104 is amplified by a suitable amplifier 106 to produce a control signal which is applied to the control element of variable gain element 98 to control the gain thereof. As in the expander of FIG. 5, the function of the difference amplifier is analogous to that of the threshold level of conventional expanders in that no change is made to the voltage level determined by the unchanged difference signal S until the signal level is above the knee of the transfer characteristic. Voltage reference $V_{ref.1}$ is provided to limit the lower knee of the expander as in conventional expanders, and $V_{ref.2}$ is provided to cut off its associated loop, because otherwise the loop gain would try to make the output of variable gain element 98 to be constant at the level of the uncompressed difference signal S. Otherwise, the operation is similar to that of the adaptive expander of FIG. 5 and produces a noise-reduced difference signal S at the output of variable gain element 98 for application to de-matrixer 54.

Figure 7:
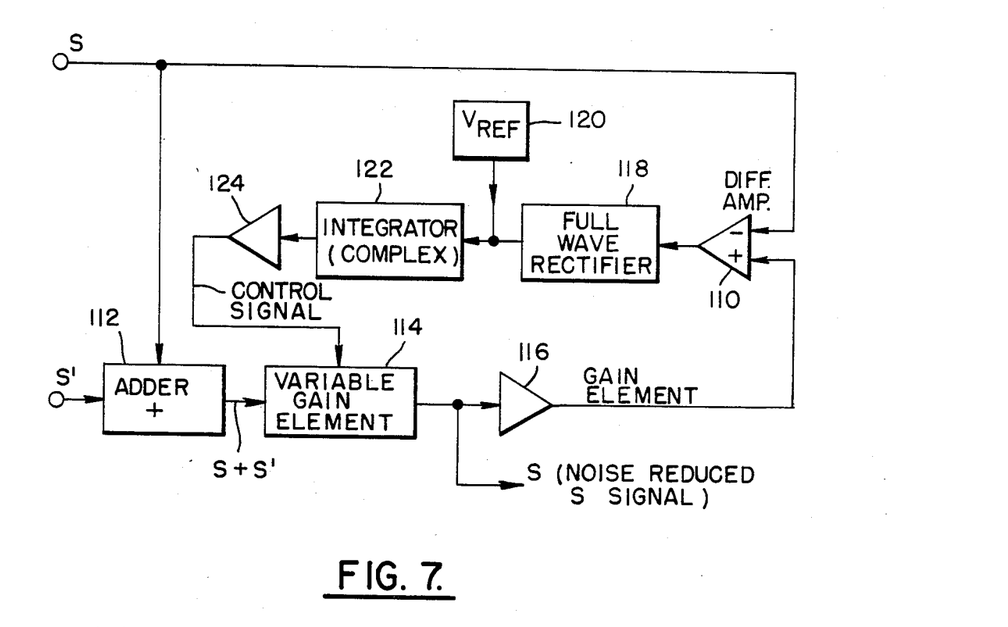
FIG. 7 is a simplified block diagram of a modified version of the adaptive expander shown in FIG. 6.

FIG. 7 shows yet another implementation of the same basic adaptive expander which effects a saving in components as compared to either of the previously described implementations in that it requires only one full-wave rectifier and one complex integrator to achieve substantially the same results. More particularly, in this case the uncompressed difference signal S is directly applied to one input of a difference amplifier 110 and is added to the compressed difference signal S' in an adder 112 to produce a sum signal which is applied to the input of a variable gain element 114. The output signal from variable gain element 114 is applied to a gain element such as an amplifier 116, the output of which is applied to the second input of difference amplifier 110. Any resulting difference signal is full-wave rectified by a rectifier 118 and the resulting direct current signal, after level adjustment by a voltage level setting device 120, is applied to an integrator 122, again of complex type, the output of which is amplified by a suitable amplifier 124 to develop a control signal for variable gain element 114. As before, the output of the variable gain element is a noise-reduced signal S for application to the de-matrixer.

The gain element 116 is included to avoid signal ambiguity at the output of full-wave rectifier 118 which would occur unless steps are taken to make sure that the signal from variable gain element 114 is always either larger or smaller than the difference signal S. Otherwise, if the two signals applied to difference amplifier 110 should be equal, the output signal from the full-wave rectifier cannot know which signal was the larger. To eliminate this possibility for ambiguity the gain element 116 is connected in the loop following the variable gain element 114 to make sure that the signal in this loop is always dominant over the difference signal S. Because gain element 116 is inside the control loop for variable gain element 114 it will automatically wash out because of the feedback nature of the system, and will not affect the amplitude of the final noise-reduced signal S appearing at the output of variable gain element. 114. Alternatively, a suitable gain element can be inserted in the S signal path to the difference amplifier to insure that this signal is always dominant, and inserting in the output line to the dematrixer an attenuator to offset the gain of the element in the S signal path.

Figure 8:
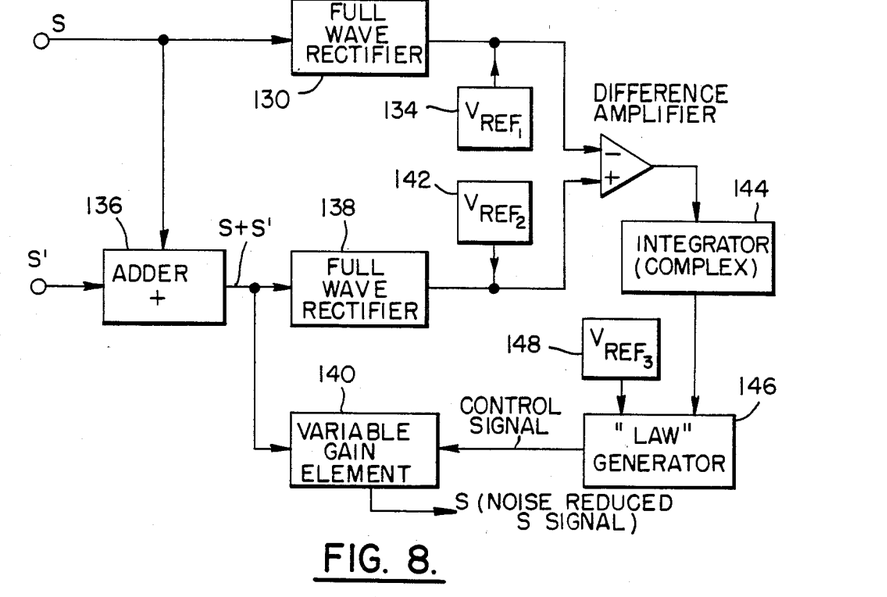
FIG. 8 is a block diagram of a feed-forward type of adaptive expander embodying the principles of the invention.

FIG. 8 is a block diagram of yet another implementation of an adaptive expander embodying the invention, this one being of the feed-forward type as opposed to the three feedback types just described. Although the feed-forward type is subject to the restrictions, not applicable to the feedback type, that the variable gain element must have a calibrated and prescribed transfer characteristic, and the control signal must be developed with appropriate gain and offsets to match that law, it can operate satisfactorily if such restrictions are taken into account. The feed-forward embodiment has many elements in common with the previously described adaptive expanders but are arranged differently as will now be described. Specifically, the uncompressed difference signal S is full-wave rectified by a rectifier 130, the output of which is applied as one input to a difference amplifier 132, the level of the rectified signal being settable by a voltage level setting device 134 designated $V_{ref.1}$. The uncompressed difference signal S is also added to the compressed difference signal S' in an adder 136 and the resulting sum signal applied to a second full-wave rectifier 138 and also to the input of a variable gain element 140. The direct current signal from rectifier 138, after being subjected to level setting by a voltage level setting device 142 designated $V_{ref.2}$ and which may be embodied in the rectifier circuitry, is applied to the other input of difference amplifier 132. Any difference signal appearing at the output of amplifier 132 is applied to an integrator 144 of the complex type described earlier, the output of which is applied as one input to a "law" generator 146, to which is also applied a reference voltage $V_{ref.3}$ derived from a suitable voltage source 148. For a given change in level of the signal from integrator 144, the "law" generator 146 produces the correct output voltage or current for application to the control element of variable gain element 140 to insure that gain element 140 gives the correct amount of gain or attenuation as may be necessary at any instant of time. For example, since the variable gain element typically is logarithmic, the law generator 146 would contain a logarithmic circuit element to match the changes in the signal from integrator 144 to decibels of attenuation in the variable gain element 140. Thus, the output of variable gain element 140 is a noise-reduced difference signal S for application to the dematrixer.

Figure 9:
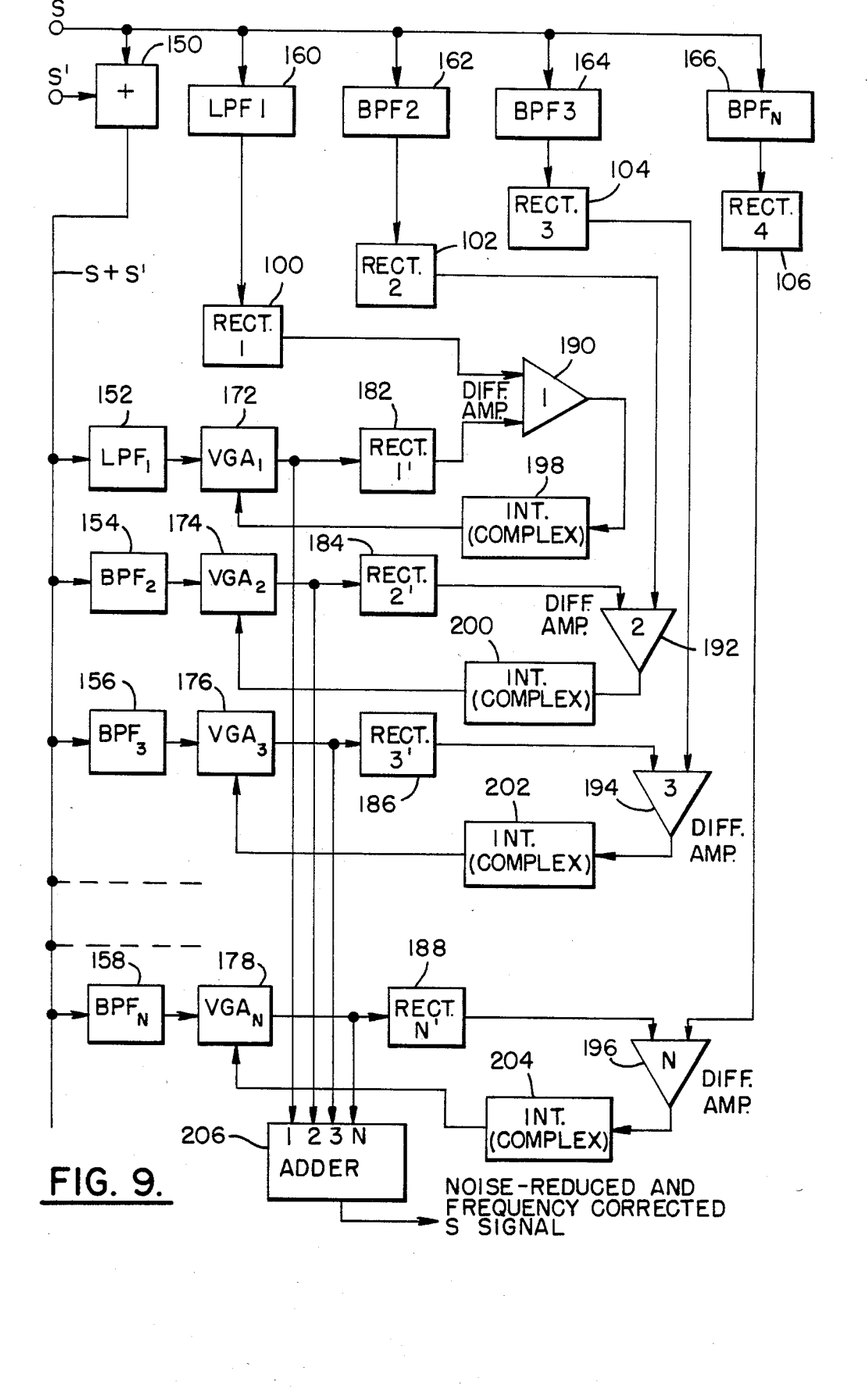
FIG. 9 is a simplified block diagram of a parallel-type frequency correcting adaptive expander.

The availability at the receiver of the uncompressed difference signal also enables the design of a frequency correcting adaptive expander, one form of which is shown in the block diagram of FIG. 9. The principle of the illustrated frequency correcting expander is to utilize the uncompressed difference signal to adaptively expand a compressed signal containing unknown frequency responsive elements. For example, the Dolby A companding system has four companded channels, each with a distinct and separate frequency band which is compressed independently according to its own signal levels. The function of the system of FIG. 9 is to separate such a multi-channel signal into corresponding separate channels and using the uncompressed difference signal, which contains all of the signal information of the compressed difference signal, to separately adaptively expand the multiple channel signals, and thereafter combining the resulting noise reduced channel signals to obtain a noise-reduced and frequency corrected difference signal for application to a dematrixer. To this end, the uncompressed difference signal S and the compressed difference signal S' are summed in an adder 150 and the resulting signal applied to an array of filters including a low pass filter 152 designated $LPF_1$ and a multiplicity of band pass filters 154, 156 and 158 respectively designated $BPF_2$, $BPF_3$ and $BPF_N$, designed to pass successively higher frequency bands in the audio frequency spectrum. The uncompressed difference signal S is applied to an equivalent set of filters 160, 162, 164 and 166 respectively designated $LPF_1$, $BPF_2$, $BPF_3$ and $BPF_N$ and having the same pass bands as the correspondingly designated filters in the other set. Each of the filters receiving the sum signal from adder 150 is connected to its own variable gain element 172, 174, 176 and 178, respectively, the outputs of which are applied to respective full-wave rectifiers 182, 184, 186 and 188. The direct current signals from these rectifiers are applied to one input of a respective difference amplifier 188, 190, 192 and 194. Similarly, the frequency bands of the uncompressed difference signal S passed by filters 160, 162, 164 and 166 are full-wave rectified by respective rectifiers 100, 102, 104 and 106 and the respective direct current output signals are applied to the other input terminal of difference amplifiers 190, 192, 194 and 196, respectively. The difference signals delivered by the difference amplifiers are applied to respective complex integrators 198, 200, 202 and 204 and the output signals therefrom after suitable amplification (not shown) are applied as control signals for variable gain elements 172, 174, 176 and 178, respectively. It will have been observed that the system of FIG. 9 is a group of four adaptive expanders each constructed according to the block diagram of FIG. 6, except that each is surrounded with a low pass filter or a band pass filter. The outputs of the multiple variable gain elements are combined in an adder 206 which combines all of the separately adaptively expanded signals together to produce at the output the total noise-reduced and frequency corrected difference signal S for application to the dematrixer. Thus, the system of FIG. 9 consists of a multiplicity of adaptive expanders, each of which operates on its own part of the frequency spectrum as defined by the associated filters. In practice, the filters need not have steep rolloff characteristics and may be, for example, of the order of 6 dB or 12 dB per octave. It will be understood that FIG. 9 illustrates an ultimate general case of a frequency correcting adaptive expander and that it may be modified to have more or less expanders to meet a specific application.

Figure 10:
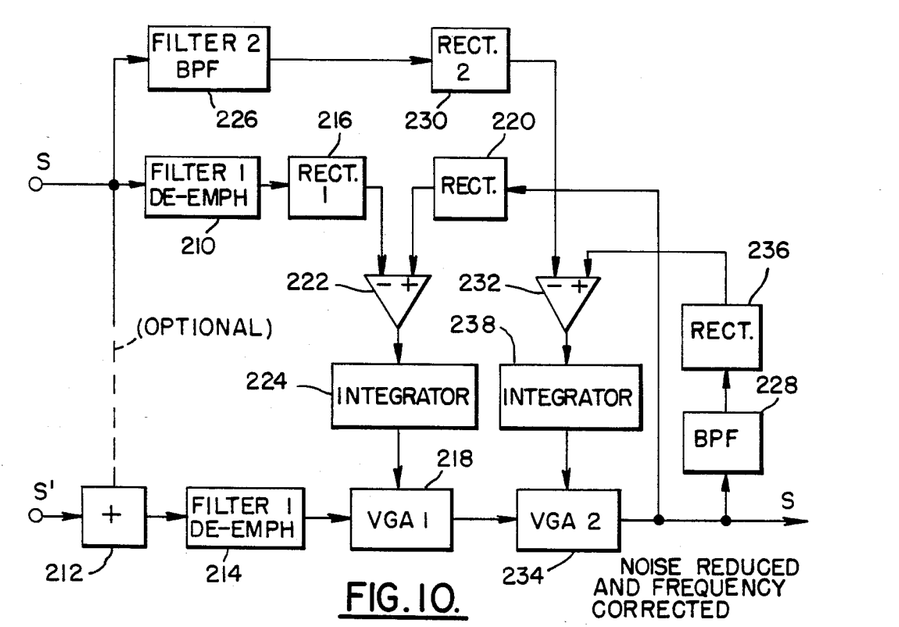
FIG. 10 is a simplified block diagram of a series-type frequency correcting adaptive compander.

FIG. 10 is a block diagram of a frequency-correcting adaptive expanding system for providing essentially the same function as that achieved with the system of FIG. 9, except in this case the filtering process is arranged in series rather than in parallel. Also, rather than showing a general case, FIG. 10 shows how the system can be applied to the agreed EIA/dbx Inc. stereo television system in which the audio difference signal is compressed by a compressor which has two variable gain elements arranged in series and includes de-emphasis and bandpass networks for effectively dividing the audio frequency spectrum into two bands. Thus, for enabling the adaptive expansion of a dbx/compressed signal, the system of FIG. 10 has two variable gain elements connected in series and includes two sets of filters for dividing the audio frequency spectrum into substantially the same bands as are used in the dbx compressor. More specifically, the uncompressed difference signal S, which again is used as a reference signal, is applied to a first filter 210, and may optionally be added to the compressed difference signal S' in an adder 212; the resulting signal is applied to a second filter 214 having the same pass characteristics as filter 210. In practice, both of filters 210 and 214 may be de-emphasis filters having characteristics comparable to those which establish the upper band in the dbx Inc. compressor. As in the arrangement of FIG. 6, the selected band of the signal S is full wave rectified by a rectifier 216 and the selected band of the signal from adder 212 is applied to a variable gain element 218. This variable gain element operates on a selected high frequency band and functions as a variable de-emphasis element. The overall output of the expander is rectified by a rectifier 220, and the direct current output signals from rectifiers 216 and 220 are applied to respective inputs of a difference amplifier 222, the output of which is applied to a complex integrator 224 which develops a control signal for variable de-emphasis element 218. The remaining portion of the spectrum of difference signal S is applied to a second filter 226 and the frequency-corrected and noise-reduced signal delivered by variable de-emphasis element 218 is applied to a wide band variable gain element 234. The output of element 234, which is the output of the expander, is also applied to a bandpass filter 228 which, again, has the same pass characteristics as filter 226. As before, the selected band of signal S is full-wave rectified by a rectifier 230 and the resulting direct current signal is applied as one input to a difference amplifier 232, and the signal passed by filter 228 is applied to a full-wave rectifier 236, the output of which is applied to the other input of the difference amplifier 232. The output signal from the difference amplifier is applied to a complex integrator 238, the output of which after suitable amplification (not shown) constitutes the control signal for variable gain element 234. Thus, it is seen that the system of FIG. 10 is similar in function to the system of FIG. 9 except that the individual adaptive expanders are connected in series with filter or variable de-emphasis elements connected between them, and the full noise-reduced and frequency corrected signal S appears at the output of the last variable gain element (i.e., element 234) in the chain. It is to be understood that in the interest of clarity only two series-connected expanders have been shown, and that additional stages can be provided should the application require.

Since the uncompressed difference signal S contains all of the dynamics of the original signal which may, for example, be music, it can be used in an adaptive expander to determine what attack and recovery times were used in the transmitter's compressor, whatever its type. By way of background, in the design of companding systems there is always a compromise between the attack and recovery times. Considering first the attack time, it can not be so short that the rate of change of gain of the signal would be so large during signal correction as to produce an audible click due to the rapid amplitude modulation of the signal. Another disadvantage of an attack time that is too short is that sharp peaks in the signal will tend to over modulate the transmitter. Accordingly, attack times of 10 to 20 milliseconds are typically used in companding systems in order to maintain a higher average modulation level by, in effect, missing the peaks on the program signal while at the same time not continuously overloading the transmitter, as would be the case if the attack time is too long.

Now briefly considering the attack and recovery times of companding systems, in order to keep the modulation of the transmitter at a maximum, the attack time of the compressor should be as short as possible so that upon occurrence of a sudden high level transient the compressor is gain adjusted downward in order not to over modulate. If the recovery time were long and the transient followed immediately by a passage of quiet music, the expander would take too long to reduce gain, and the transmission channel noise would be heard fading away. On the other hand, a recovery time that is too short is undesirable because there will be gain modulation during each cycle, or cycle-following of low frequencies and consequent increase in distortion. These conflicting requirements of attack and recovery times are usually met by making compromised choices or by using complex integrators, such as the one used in the "CX" companding system described in commonly assigned U.S. Pat. No. 4,376,916, which has multiple and complex attack and recovery times for different signal conditions.

The above-outlined characteristics of companding systems are equally present when considering an adaptive expander because it is not possible to make the attack time of the adaptive expander infinitely short, nor its recovery time very long. If this could be done the output dynamics of the signal would be good because if, for instance, the reference signal S had a transient that went up and then recovered in a certain way, the compressor at the transmitter would alter those dynamic ratios and an adaptive expander would, if not limited by recovery or attack time integrators, seek to establish the correct signal level and put the output right. However, in practice, for a low frequency transmitted signal such an adaptive expander itself would cycle-follow and cause distortion. Consequently, even an adaptive expander must have attack and recovery time elements, preferably of the complex type as shown and described in the embodiments discussed thus far. However, it will be seen that it is possible to adapt the integrator of the adaptive expander to the attack and recovery time constants of the compressor at the transmitter.

Figure 11:
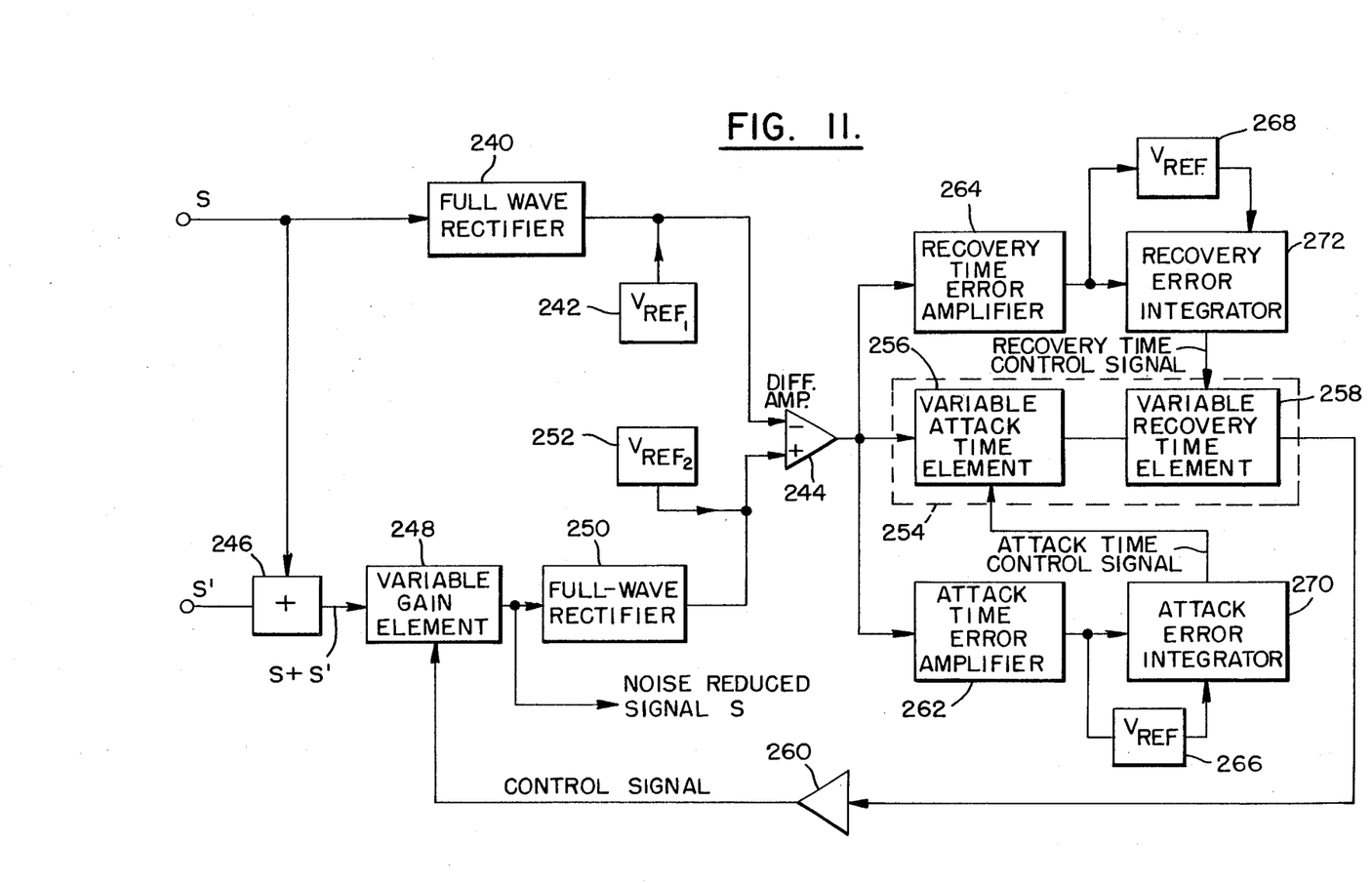
FIG. 11 is a simplified block diagram of an adaptive expander having automatic adaptive time constants.

Referring to FIG. 11, which illustrates in block diagram form a feedback type of adaptive expander corresponding generally to the arrangement shown in FIG. 6, the uncompressed difference signal S is full-wave rectified by a full-wave rectifier 240 and the direct current output signal, after being subjected to level setting by a voltage reference element 242 (which may be incorporated in the rectifier circuitry), is applied as one input to a difference amplifier 244. The uncompressed and compressed difference signals are summed by an adder 246 and the resulting signal is applied to a variable gain element 248. As before, the output signal from the variable gain element is full-wave rectified by a rectifier 250 and its dc output signal adjusted in level by a voltage reference device 252 and thereafter applied as the second input to difference amplifier 244. The output signal from the difference amplifier is applied to a complex integrator 254 which includes a variable attack time element 256 and a variable recovery time element 258. The output of the integrator, after suitable amplification by an amplifier 260, becomes the control signal for variable gain element 248. Again, as before, the output of the variable gain element is the noise-reduced signal S and, as will be seen, is also adapted to the dynamics of the original signal.

When the signal at the output of difference amplifier 244 becomes large on a transient basis, it is known that there is a large error in either the attack or the recovery time constants of integrator 254, and for the reasons discussed above it is desirable that the integrator be adjusted to always go for the longest possible attack time and the longest possible recovery time. This is accomplished by also applying the output signal from difference amplifier 244 to two sensing amplifiers: an attack time error amplifier 262 and a recovery time error amplifier 264. Each of the sensing amplifiers 262 and 264 has an associated voltage reference element 266 and 268, respectively, which establishes a voltage level against which the output signal from the amplifier is compared to determine the magnitude of the error signal from difference amplifier 244. It is possible to distinguish whether the error is an attack time error or a recovery time error because the polarity of the error signal for attack time is the opposite of the polarity of the error signal for recovery time. Thus, the error signal can, in either case, be integrated to develop a control signal for altering the attack and recovery time constants of integrator 254. To this end, the error signal from sensing amplifier 262 is applied to an attack error integrator 270, which develops a control signal which is applied to the control element of variable attack time element 256 of integrator 254, and the error signal output of sensing amplifier 264 is applied to recovery error integrator 272, which develops a recovery time control signal for adjusting the recovery time of variable recovery time element 258. Variable attack time element 256 may take the form of an RC circuit including a series resistor and a capacitor connected to a ground reference in which the resistive element is controllably variable; for example, the resistor may be either a variable current source or a field effect transistor (FET) arranged to be controlled by the control signal from the attack error integrator. Thus, for example, if the attack time of integrator 254 had initially been set to have a long time constant and a signal is received having a short attack time, a large attack time error would be sensed, and if it exceeded the level established by $V_{ref}$ 266, the control signal would change the resistance of the variable resistance element in a direction to shorten the attack time constant. Meanwhile, the attack error integrator 270 would very slowly relax to again exhaust a long attack time constant.

The time constant of the variable recovery time element 258 may be controlled by the parallel combination of a resistor and a capacitor for discharging the main integrating capacitor; again, the resistor may take the form of either a variable current source or a variable resistor, or similar circuit element, adapted to be controlled by the control signal developed by the recovery error integrator 272. As in the case of the variable attack time element, the controllable resistor in element 258 would normally be set to exhibit its longest possible recovery time constant (within reason) and to be shortened in response to the recovery time control signal. It will now be apparent that the system of FIG. 11, which is basically the same as that of FIG. 6 except that the complex integrator is replaced by a controllable complex integrator, will automatically adapt to the attack and recovery dynamics of the compressed signal, all made possible by using the uncompressed difference signal S as a reference.

It will, of course, be understood that the three general types of adaptive expander described above are not mutually exclusive and, in fact, they can be combined in a variety of permutations and combinations. For example, one or the other of the frequency-correcting arrangements of FIGS. 9 and 10 could be combined with the just described adaptive attack and recovery time expander feature. Also, it will be recognized by ones skilled in the companding art that the described adaptive techniques for expanding compressed signals are equally applicable to compressors should a situation arise requiring them.

It should now be evident that the transmission of the uncompressed difference signal S along with a compressed version S' of the difference signal, enables utilization of the uncompressed difference signal at the receiver as a reference signal to make an expander adaptive to any companding law and which enables decoding of dynamic parameters of the received signal, such as frequency response, and attack and recovery time constants, so that all of the parameters of the original signal can be restored automatically, regardless of the transmission system.

Although several specific embodiments of the invention have been illustrated and described, they are exemplary only, and such variations and modifications as will now be suggested by those skilled in the art will be understood as forming a part of the present invention insofar as they fall within the spirit and scope of the appended claims.

For example, the invention may be used in other than the described frequency modulation system, including amplitude modulation, phase modulation, delta modulation, pulse and pulse code modulation. The carrier may be any of a variety of forms, including visible or infrared light, and multiplexed satellite distribution systems. The various functions shown in the block diagrams may be implemented in many ways so as to achieve ideal and/or robust characteristics; for example, the full-wave rectifier and integrator typically form an envelope detector of which various implementations, including r.m.s. detectors, are available. Also, although the described use of a quadrature channel permits the transmission of the compressed difference signal without requiring an increase in bandwidth, if additional bandwidth is available, it is then possible to use an additional carrier, sufficiently removed in frequency from the S subcarrier, to contain the compressed difference signal.

We claim:

1. An adaptive expander for use in the receiver of a biphonic FM stereophonic broadcasting system which is adapted to receive a stereo difference signal S and a compressed version S' of said stereo difference signal, said expander comprising:

an electronically controllable variable gain device having input, output and control terminals, means for applying said compressed difference signal S' to the input terminal of said variable gain device, and control signal generating means for generating a control signal responsively to both said compressed difference signal S' and said difference signal S and applying the control signal to the control terminal of said variable gain device for causing the gain between the input and output of the variable gain device to have a value dependent on the value of said control signal.

2. An adaptive expander as defined in claim 1, wherein said control signal generating means includes means including comparator means for dynamically comparing a signal proportional to the signal produced at the output terminal of said variable gain device against a signal proportional to said difference signal S for producing an error signal proportional to differences between said signals S and S', and means for processing said error signal to produce said control signal.

3. An adaptive expander as defined in claim 2, wherein said means for applying said difference signal S' to said variable gain device includes means for summing said difference signal S and said compressed difference signal S' and applying the resulting sum signal to the input terminal of said variable gain device, and wherein said control signal generating means includes rectifier means for causing said control signal to be a direct current signal which substantially follows dynamic variations of the error signal produced by said comparator means.

4. An adaptive expander as defined in claim 3, wherein said rectifier means comprises first rectifier means responsive to the difference signal S for producing a first rectified signal having a level proportional to the amplitude of and which substantially follows dynamic variations of the difference signal S, and means for applying said first rectified signal to said comparator means, and second rectifier means responsive to the signal produced at the output terminal of said variable gain device for producing a second rectified signal having a level proportional to the amplitude of and which substantially follows dynamic variations of the output signal from said variable gain device, and means for applying said second rectified signal to said comparator means.

5. An adaptive expander as defined in claim 4, wherein said control signal generating means includes complex integrator means consisting of a network of signal paths having differing time constants for modifying said control signal to minimize program modulated noise in spite of rapid changes in level of said signals S and S'.

6. An adaptive expander as defined in claim 5, wherein said complex integrator means comprises a single integrator circuit having an input connected to receive the error signal from said comparator means and having an output coupled to the control terminal of said variable gain device.

7. An adaptive expander as defined in claim 5, wherein said complex integrator means comprises:
   a first integrator circuit having an input connected to receive said first rectified signal and having an output coupled to said comparator means, and
   a second integrator circuit having an input connected to receive said second rectified signal and having an output coupled to said comparator means.

8. An adaptive expander as defined in claim 3, wherein said difference signal S is directly applied to said comparator means,
   wherein said rectifier means comprises a single rectifier responsive to said error signal for producing a rectified error signal having a level proportional to the amplitude of and which substantially follows dynamic variations of said error signal, and
   wherein said control signal generating means further includes complex integrating means consisting of a network of signal paths having differing time constants for modifying said rectified error signal to produce said control signal.

9. An adaptive expander as defined in claim 1, wherein said means for applying said compressed difference signal S' to said variable gain device comprises means for summing said difference signal S and said compressed difference signal S' and applying the resulting sum signal to the input terminal of said variable gain device, and
   wherein said control signal generating means includes comparator means for dynamically comparing a signal proportional to said sum signal against a signal proportional to said difference signal S for producing an error signal proportional to differences between said signals S and S', and
   means for processing said error signal to produce said control signal.

10. An adaptive expander as defined in claim 9, wherein said control signal generating means further includes
    first rectifier means responsive to the difference signal S for producing and applying to said comparator means a first rectified signal having a level proportional to the amplitude of and which substantially follows dynamic variations of the difference signal S,
    second rectifier means responsive to said sum signal for producing and applying to said comparator means a second rectified signal having a level proportional to the amplitude of and which substantially follows dynamic variations of said sum signal, and
    wherein said means for processing said error signal includes integrator means consisting of a network of signal paths having differing time constants.

11. An adaptive expander as defined in claim 10, wherein said error signal processing means further includes circuit means for modifying the output signal from said integrator means to produce a control signal which is adapted to the gain characteristics of said variable gain element.

12. An adaptive expander as defined in claim 5, wherein the means for applying the difference signal S to said first rectifier means includes first filter means for applying to said first rectifier means a selected frequency band of the difference signal S, and
    wherein the means for applying the output signal from said variable gain device to said second rectifier means includes second filter means having substantially the same pass characteristics as said first, filter means for coupling said selected frequency band of said output signal to said second rectifier means.

* * * * *